United States Patent [19]

Frola

[11] Patent Number: 4,568,803

[45] Date of Patent: Feb. 4, 1986

[54] INVERTED PYRAMID TELEPHONE BOOTH

[76] Inventor: Pasquale Frola, Via Alcide Cervi, 41, Naples, Italy

[21] Appl. No.: 583,076

[22] Filed: Feb. 23, 1984

[51] Int. Cl.[4] .................... H04M 1/11

[52] U.S. Cl. .................... 179/183; D25/16

[58] Field of Search .................... D25/16; 179/6.3 CC, 179/148 R, 90 K, 183, 184, 2 DP

[56] References Cited

U.S. PATENT DOCUMENTS

| | | | |
|---|---|---|---|
| D. 194,529 | 2/1963 | Nawman et al. | D25/16 |
| D. 244,455 | 5/1977 | Crump et al. | D25/16 |
| 3,932,709 | 1/1976 | Hoff et al. | 179/90 K |
| 4,037,067 | 7/1977 | Solomovitz | 179/184 |
| 4,063,046 | 12/1977 | Schiffman et al. | 179/90 K |
| 4,151,380 | 4/1979 | Blomeyer et al. | 179/148 R |

FOREIGN PATENT DOCUMENTS

| | | | |
|---|---|---|---|
| 1132378 | 10/1968 | United Kingdom | 179/183 |

OTHER PUBLICATIONS

Sederholm et al., "Intelligent Telephone" *IBM Technical Disclosure Bulletin,* vol. 23, No. 9, Feb. 1981, pp. 4006–4008.

*Primary Examiner*—Keith E. George

*Attorney, Agent, or Firm*—Joseph C. Mason, Jr.; Herbert W. Larson

[57] ABSTRACT

A telephone booth having the appearance of an inverted truncated pyramid, wherein one side of the pyramid enclosure permits access to the booth. Within the booth is the dialing mechanism which is indirectly connected to the dialing circuitry. Also within the booth are remote voice transmitting and receiving devices which are activated by credit cards, tokens or coins. Safe storage for the tokens is in the base of the booth. The supporting column for the booth acts as a conduit for the tokens. The improved telephone booth is virtually vandal-proof and is intended for use as part of a telephone system network.

9 Claims, 9 Drawing Figures

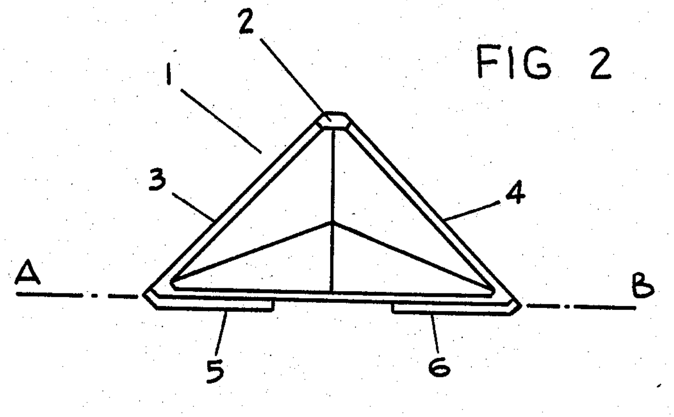
FIG 2
FIG 3
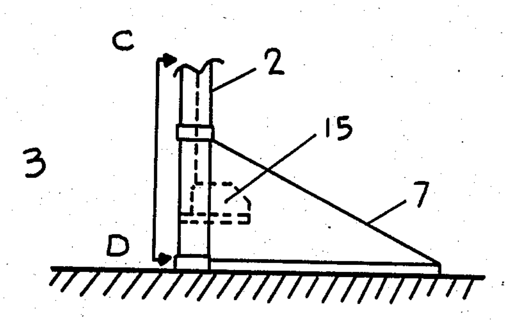
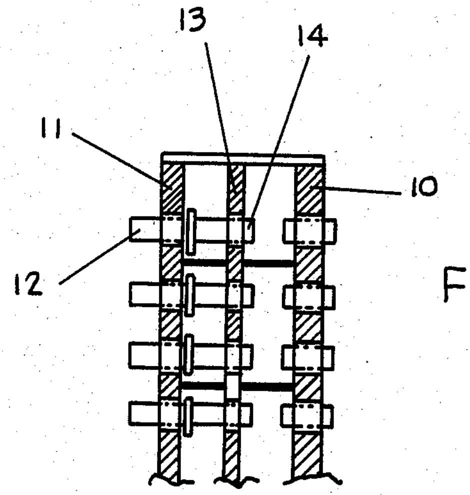
FIG 4

INVERTED PYRAMID TELEPHONE BOOTH

BACKGROUND OF THE INVENTION

1. Field of Invention

This invention relates to an improved telephone booth, and particularly relates to a telephone booth having the shape of an inverted truncated pyramid and containing remote activated dialing mechanism and remote activated voice receiving and transmitting devices. It specifically relates to a telephone booth containing features for safekeeping of money and for tamper-proof telephone circuitry.

The telephone booth has become an accepted item on the personal and commercial scene. The traditional booth, as seen in airports, along roads, and other places of common use, is a rectangular box which houses a telephone. The telephone inside the box has a dialing mechanism, a hand-held receiver for talking and listening which is connected by a telephone cord to the telephone circuitry, and a coin slot for placement of coins to activate the telephone. The coins are usually collected in a locked box just beneath the dialing mechanism. The hand-held receiver is stored in a holder which acts as a switch to activate the telephone circuitry when removed for use of the telephone. The user of the telephone must activate the switch by removing the receiver from the holder and must activate the voice communication circuitry by placing the proper amount of money in the coin slot. Both tasks must be completed by the user before the telephone can be used to communicate.

2. Description of the Prior Art

The prior art telephone booths all have the disadvantage in that privacy is difficult to achieve and maintenance costs are high due to vandalism. The rectangular box type booth gives some measure of privacy since the user stands or sits totally within the box. However, such construction is relatively expensive and these total-enclosure boxes are subject to vandalism. Vandalism takes the forms of mutilating the dial mechanism which requires expensive replacement repairs; of pulling the cord off entirely requiring full replacement; of breaking open the money box and robbing its contents requiring the repair or replacement of the box or lock. The ease of destruction or vandalism is in part caused by the fact that the user-vandal can stand in front of the telephone, act as if using the phone, and perform the acts of vandalism. The "more-open" type prior art telephone booths give more security against vandalism but at the expense of privacy. The more-open booth includes those with simple partitions between multiple telephones and those with some form of partition from the waist up of the user on two sides and, perhaps, over the user's head; in each instance, the user's body is largely outside the more-open booth structure.

SUMMARY OF THE INVENTION

The present invention is an improved telephone booth over the prior art booths.

An object of the present invention is to provide an improved telephone booth for use as part of a telephone system or network.

Another object of the present invention is to provide an improved telephone booth of novel design which is relatively inexpensive, private and vandal-proof.

A further object of the present invention is to provide an improved telephone booth which has enclosure means of an inverted truncated pyramid.

A still further object of the present invention is to provide an improved telephone booth which has within an inverted truncated pyramid enclosure remote voice transmitting and receiving devices.

Another more specific object of the present invention is to provide an improved telephone booth which has within an inverted truncated pyramid enclosure a dialing mechanism which is indirectly connected to the dialing circuitry.

A still further specific object of the present invention is to provide an improved telephone booth which has a base and support column interconnected so as to provide a secure storage for tokens at a location beneath the base.

These and other objects of the present invention will be evident from the detailed description of the invention and with reference to the appended drawings, in which:

BRIEF DESCRIPTION OF THE DRAWINGS

FIG. 2 and FIG. 3 are sections of the telephone booth along lines A-B and C-D, respectively, of FIG. 1;

FIG. 4 illustrates one embodiment of a dialing mechanism;

DESCRIPTION OF THE PREFERRED EMBODIMENTS

Figure 1:
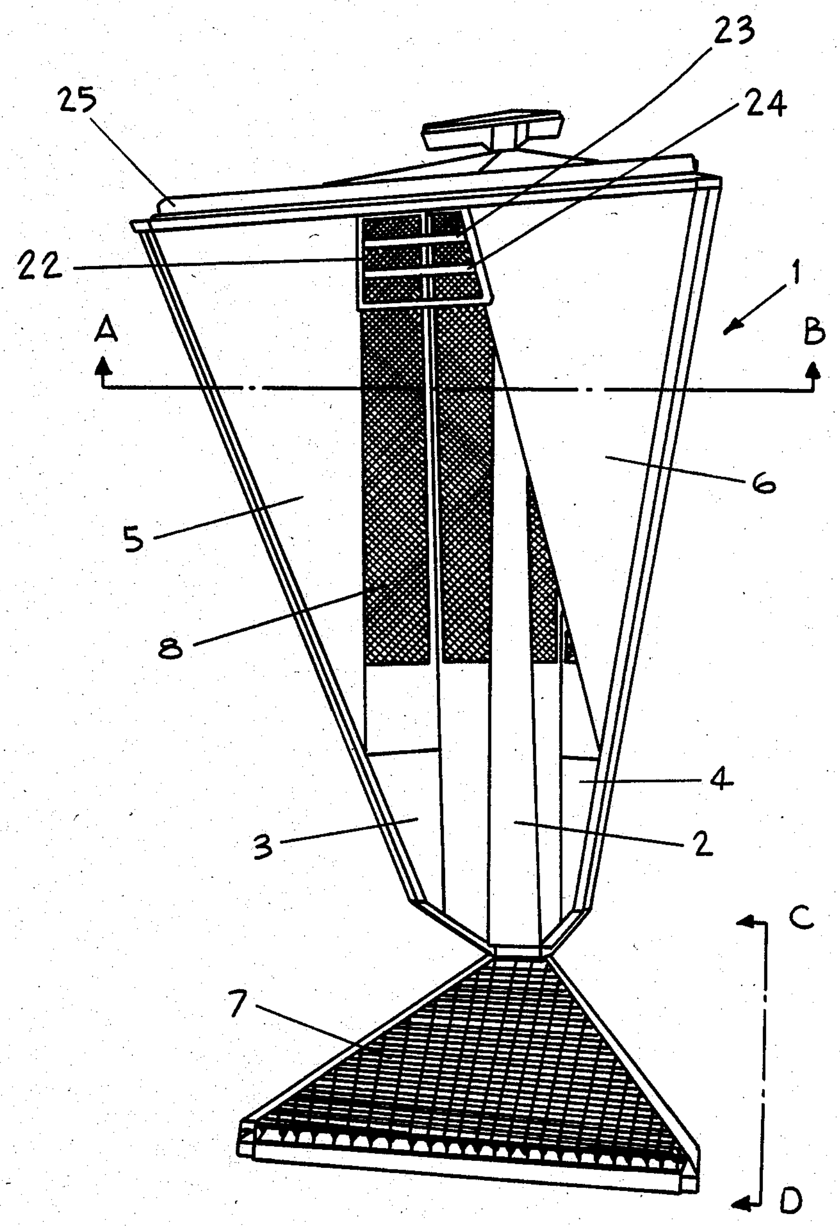
FIG. 1 is a full front view of the improved telephone booth.

Therefore, the present invention provides an improved telephone booth for use as part of a telephone system comprising an inverted truncated pyramid enclosure means; access means sufficient to permit entry into the enclosure; a base within the enclosure; a support column mounted opposite the access in cooperation with the base; and means within the enclosure for voice communication.

Another embodiment comprises the telephone booth of the invention wherein the base slopes downwardly from the column to the lowermost point of entry of the access means.

A further embodiment comprises the telephone booth of the invention wherein the column functions as a conduit for tokens used to activate the voice communication means.

A more specific embodiment of the present invention provides an improved telephone booth for use as part of a telephone system comprising an inverted truncated pyramid enclosure means which has a substantially triangular plan with its minor base directed downwardly; access means formed by one of the sides of the pyramid; a base within the enclosure adapted to form a collecting box underneath; a support column mounted vertically and opposite the access in cooperation with the base; and means within the enclosure for voice communication.

Another specific embodiment comprises the telephone booth of the invention wherein the column functions as a conduit to the collecting box for tokens used to activate the voice communication means.

The preferred embodiment of the invention provides a telephone booth for use as part of a telephone system comprising an inverted truncated pyramid enclosure means which has a substantially triangular plan with its minor base directed downwardly, access means formed by one of the sides of the pyramid enclosure; a base within the enclosure adapted to form a collecting box underneath; a support column mounted vertically and opposite the access in cooperation with the base; a dialing means within the enclosure indirectly connected to a dialing mechanism for access to the telephone system for outgoing telephone calls; and means within the enclosure for voice communication.

A further preferred embodiment comprises the telephone of the present invention wherein the column functions as a conduit to the collecting box for tokens used to activate the dialing means.

A specifically preferred embodiment of the invention provides a telephone booth for use as part of a telephone system comprising an inverted truncated pyramid enclosure having a substantially triangular cross-section selected from the group consisting of a right triangle cross-section, an oblique triangle cross-section, and an equilateral triangle cross-section; access to the enclosure through one of the sides to the pyramid, a base within the enclosure sloping downwardly from the sides of the pyramid to the lowermost point of entry of the access side of the pyramid; a collecting box means associated with the base; a support column mounted vertically and opposite the access in cooperation with the base; a slot to receive tokens; conduit means associated with the column for passage of tokens from the slot to the collecting box; sound wave activated receiving and transmitting means for voice communication located within the sides of the pyramid enclosure; and, push-button dial device indirectly connected with the telephone dialing circuitry for connection to the telephone system for outgoing telephone calls.

Referring to the drawings by character of reference, the telephone booth of the present invention, as shown generally by 1, is a frontal view of an inverted truncated pyramid. Walls 3 and 4 are two walls of the pyramid intersecting at the vertical plane 2 which also depicts the support column. Segments 5 and 6 are portions of the forward wall of the pyramid which has been partially truncated to permit access to the enclosure by a telephone user. The entire structure is of sufficient size to accommodate the average human body forms. For example, the booth may have an effective height of from 80 to 90 inches, a width of from 30 to 40 inches, and a depth from 30 to 40 inches. A cross-sectional area at shoulder height of an average user of approximately 1600 square inches would be appropriate.

The booth has a floor or base 7 which is connected to the support column 2 and preferably slopes downwardly from the support column 2 to the ground level or lowermost point of entry to the access opening between wall segments 5 and 6. Preferably, the base is grating material of the type well known to those in the art although any suitable material of construction may be used. The floor or base must be of sufficient strength to hold the weight of a human user with safety. The angle of floor in its preferred downward pointing direction is sufficient for a user to be comfortable in a standing posture and sufficient to position the user's head and shoulders into the upper portion of the free access area between wall portions 5 and 6. By this position, the booth is substantially closed to outside influences and user privacy of conversation is assured.

For further privacy, walls 3, 4, 5, and 6 may be made of acoustical or sound absorbing material or lined with acoustical tile or other sound absorbing material well known to those skilled in the art. The walls may be composed of any suitable construction material such as wood, metal, or plastic (synthetic) matter, or any combination of wood, metal, or plastic (synthetic) matter. Preferably walls 3, 4, 5, and 6 comprise plastic matter, such as high impact polyethylene, polypropylene, or the like.

Walls 3, 4, 5, and 6 may also be solid walls or of hollow construction. Hollow construction is preferred, in that hollow walls are usually more sound resistant and equipment may be placed between the outer surfaces of the wall. In addition, the surface of these walls facing the interior of booth 1 may have a protective coating or shield 8, such as stainless steel or scratch resistant synthetic materials, well known to those skilled in the art.

The preferred triangular plan for the booth is shown in FIG. 2. As shown, the intersection of walls 3 and 4 form a right angle (90°) at support column 2. Other plan arrangements are equally satisfactory such as an equilateral triangle and oblique triangle. The equilateral triangle plan would have some advantages by providing a larger cross-sectional area within the enclosure than other plans. However, the right angle plan is better because walls 3 and 4 will have efficient separation for placement of the telephone devices as contemplated by this invention.

As shown in FIG. 3 support column 2 may be hollow 40 thereby providing a conduit for the passage of tokens 42 from slot 46 in walls 3 or 4 (FIG. 7) to a collection box 15 which is located beneath the floor or base 7. The slot or token receiving device is conventional and may have associated therewith a suitable token counting device as part of the telephone activating system. As used herein, the term "token" is intended to means coins of acceptable currency for the country in question or tokens of artificial value for use in activating the telephone mechanism and circuitry in the usual manner. However, the telephone booth of the present invention also contemplates the use of "plastic" cards, e.g., telephone credit card 34 (FIG. 8), to activate the telephone in which case collection box 15 could be eliminated or used in addition to the use of such cards. The support column 2 may also be of solid construction, in which case a separate conduit (not shown) can be provided to connect the token injection slot (not shown) with the collection box 15. Optionally, base 7 may be horizontally placed with respect to the booth foundation or ground (not shown) in which case the collecting box 15 may be buried underneath the base. In any case, access to collecting box 15 may be by any security means such as lock and key. By placing collecting box 15 beneath the base or floor of the booth makes tampering with the box difficult because of visibility and the obvious stooping position needed by a vandal to tamper with the box. Floor or base 7 may have a small cover plate (not shown), which also is locked, for full access by any person authorized to collect tokens from the collecting box.

Figure 5:
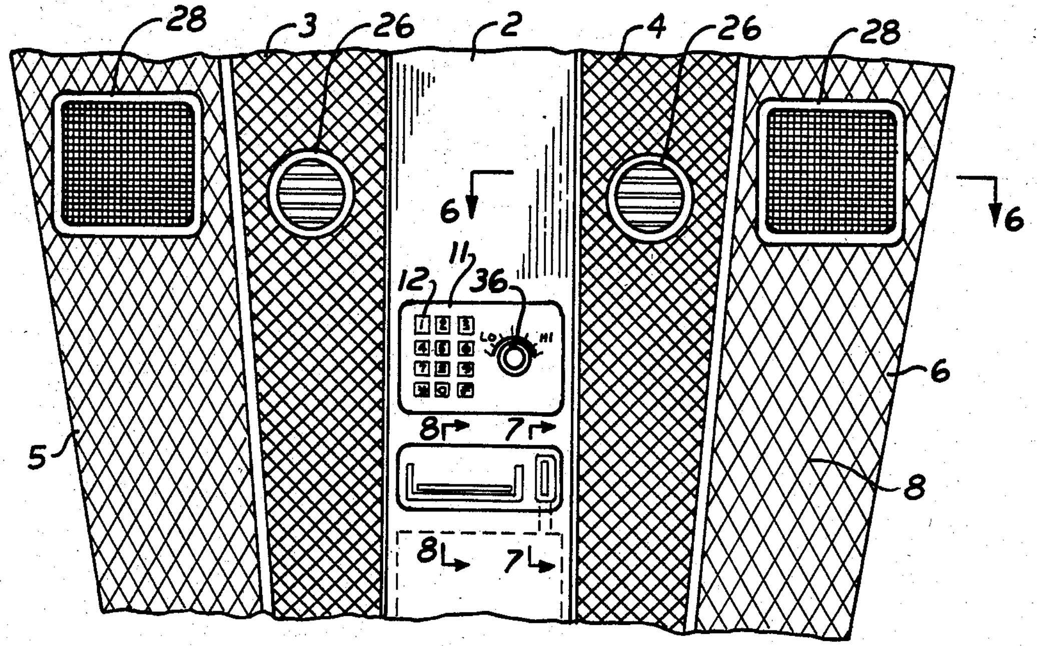
FIG. 5 is an illustration of the interior of the booth shown in FIG. 1.
Figure 9:
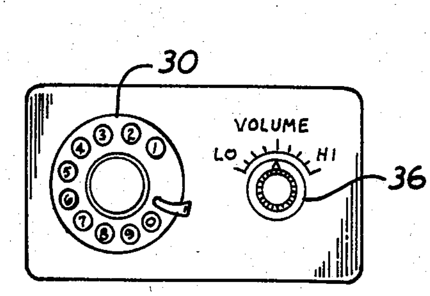
FIG. 9 is a front view of an alternate dialing mechanism shown in FIG. 5.

The actual telephone device or apparatus, such as the dial mechanism 30 (FIG. 9) and voice receivers 28 and transmitters 26, is conventional but for purposes of this invention is preferably placed at a remote location from the telephone booth. The enclosure design of this invention has as an integral part loudspeakers 28 (FIG. 5) placed within walls 3, 4, 5, and 6 according to the desires of the telephone company. Preferably, these loudspeakers 28 are placed within walls 3 and 4 which are of hollow construction. The loudspeakers can be of conventional design including loudness volume control buttons 36. By controlling the volume for voices through the loudspeaker, the telephone user can easily hear the other party but will not be overheard by outsiders in close proximity to the telephone booth in question. These loudspeaker devices 28 are part of and are conventionally connected into, remotely located transmitters as part of the telephone system by other devices well known in the art.

Figure 6:
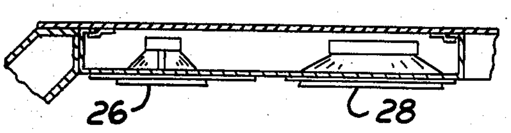
FIG. 6 is a cross-section along lines 6—6 of FIG. 5 showing a speaker and a voice receiving device.

The telephone booth of the present invention has, additionally, voice transmission apparatus 26, such as voice amplifiers and microphones connected into the telephone system by other devices well known in the art. These microphones (FIG. 6) are an integral part of the booth design and may be placed within walls 3 and 4. However, such microphones may be placed anywhere within the booth enclosure as in any one or more of walls 3, 4, 5 and 6. These microphones are of sufficient sensitivity to pick up normal speaking voices within the telephone booth and transmit such spoken words into and through the remote telephone receivers as part of the telephone system.

The actual telephone dialing mechanism or circuitry for purposes of this invention is remotely located with respect to the interior of the booth. As shown in FIG. 4, the telephone booth of the present invention preferably has as an integral part of the booth a dialing device which is accessible by a user but is indirectly connected to the actual telephone dialing mechanism. In FIG. 4, suitable push buttons 12 are contained by keyboard 11 which is designed for limited directional run for push buttons 12. The push buttons 12 may only be displaced through the distance between keyboard 11 and limited device 13. As shown, push buttons 12 have sufficient length such that when fully depressed appendix 14 will strike activator 10 for purposes of transmitting an appropriate dial signal into the telephone system. The depression of push buttons 12 to the limit may interconnect indirectly with the actual telephone dialing mechanism or circuitry by any means known to the art, such as by mechanical means, pneumatic signal, or by electronic or electric pulse (audio) signal.

In addition, it is within the broad scope of this invention of the telephone booth for the mechanism to serve as a system command module to computer means and operably associated CRT display means. The CRT display means are preferably placed within the enclosure (not shown). The computer means may be indirectly connected to the dial means, e.g., pushbutton mechanism, such as by telemetering. In this embodiment, the telephone booth user may perform word processing operations and/or mathematical computations within the booth and transmit the results to the person called, or display the results on the CRT screen, or receive information as displayed on the CRT screen as it is received from the other end of the communication link, or any combination of the above.

Figure 7:
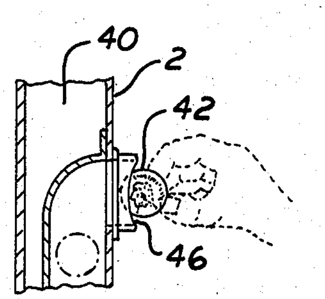
FIG. 7 is a cross-section along lines 7—7 of FIG. 5.
Figure 8:
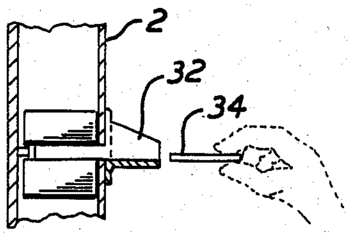
FIG. 8 is a cross-section along lines 8—8 of FIG. 5.

Referring again to FIG. 1, the telephone booth of the present invention may be equipped with suitable lighting means 22, which may be placed between walls 5 and 6. Such lighting means may also serve to further enclose the booth at the top for more privacy. It also may include artificial lighting sources 23 and 24. One light source can be activated by placing tokens 42 into the slot 46 (FIG. 7). The other light source may be heat activated such as by the heat or presence of the human body of a telephone user who enters the booth. These devices are known to the art and need not be further described here.

Finally, as shown by FIG. 1, the telephone booth of the present invention may have suitable rain gutters 25 installed on the three slopes of the roof. The gutters 25 may be connected to drain pipe(s) (not shown) such that rainwater is directed to the surface beneath floor 7 for removal of debris by the washing action of the rainwater.

The foregoing is considered as illustrative only of the principles of this invention. Further, since numerous modifications and changes may readily occur to those skilled in the art, it is not desired to limit the invention to the exact construction, design, and mode of operation shown and described, and accordingly, all suitable modifications and equivalents may be resorted to, falling within the broad scope of the invention.

I claim:

1. Telephone booth for use as part of a telephone system comprising:

(a) an inverted truncated pyramid enclosure attached at a bottom portion to a separate base;

(b) access means sufficient to permit entry into the enclosure (c) a support column for the enclosure mounted vertically and opposite the access in cooperation with the base;

(d) means within the enclosure for voice communication connected to a telephone system; and (e) with the column functioning as a conduit to the base for tokens used to activate the voice communication means.

2. Telephone booth for use as part of a telephone system comprising:

(a) an inverted truncated pyramid enclosure having a substantially triangular plan with a minor base directed downwardly attached to a separate base;

(b) access means formed by one of the sides of the pyramid;

(c) the separate base adapted to form a collecting box underneath;

(d) a support column for the enclosure mounted vertically and opposite the access in cooperation with the separate base; and (e) means within the enclosure for voice communication connected to a telephone system.

3. Telephone booth according to claim 2 wherein the base slopes downwardly from the column to the lowermost point of entry of the access means.

4. Telephone booth according to claim 2 wherein the column functions as a conduit to the collecting box in the separate base for tokens used to activate the voice communication means.

5. Telephone booth for use as part of a telephone system comprising:

(a) an inverted truncated pyramid enclosure having a substantially triangular plan with a minor base directed downwardly attached to a separate base;

(b) access means formed by one of the sides of the pyramid enclosure;

(c) the separate base adapted to form a collecting box underneath;

(d) a support column for the enclosure mounted vertically and opposite the access in cooperation with the separate base;

(e) a dialing means within the enclosure indirectly connected to a dialing mechanism for access to the telephone system for outgoing telephone calls; and (f) means within the enclosure for voice communication connected to a telephone system.

6. Telephone booth according to claim 5 wherein the column functions as a conduit to the collecting box for tokens used to activate the dialing means.

7. Telephone booth according to claim 6 wherein the base slopes downwardly from the column to the lowermost point of entry of the access means.

8. Telephone booth for use as part of a telephone system comprising:

(a) an inverted truncated pyramid enclosure having a substantially triangular cross-section selected from the groups consisting of a right triangle cross-section, an oblique triangle cross-section, and an equilateral triangle cross-section;

(b) access to the enclosure through one of the sides to the pyramid;

(c) a separate base attached to the bottom of the pyramid sloping downwardly from the sides of the pyramid to the lowermost point of entry of the access side of the pyramid;

(d) a collecting box means associated with the base;

(e) a support column for the enclosure mounted vertically and opposite the access in cooperation with the base;

(f) a slot to receive tokens;

(g) conduit means associated with the column for passage of tokens from the slot to the collecting box;

(h) sound wave activated receiving and transmitting means for voice communication located within the sides of the pyramid enclosure; and (i) push-button dial device indirectly connected with the telephone dialing circuitry for connection to the telephone system for outgoing telephone calls.

9. Telephone booth according to claim 8 wherein said triangular cross-section is a right triangle cross-section.

* * * * *